US009473223B2

(12) United States Patent
Kotecha et al.

(10) Patent No.: US 9,473,223 B2
(45) Date of Patent: *Oct. 18, 2016

(54) METHODS FOR OPTIMAL COLLABORATIVE MIMO-SDMA

(71) Applicant: Apple Inc., Cupertino, CA (US)

(72) Inventors: Jayesh H. Kotecha, Austin, TX (US); Jayakrishnan C. Mundarath, Madison, WI (US)

(73) Assignee: Apple Inc., Cupertino, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 13/764,672

(22) Filed: Feb. 11, 2013

(65) Prior Publication Data

US 2013/0163517 A1    Jun. 27, 2013

Related U.S. Application Data

(63) Continuation of application No. 11/535,702, filed on Sep. 27, 2006, now Pat. No. 8,374,650.

(51) Int. Cl.
*H04M 1/00* (2006.01)
*H04B 7/04* (2006.01)

(52) U.S. Cl.
CPC ............ *H04B 7/0417* (2013.01); *H04B 7/043* (2013.01)

(58) Field of Classification Search
CPC .............................. H04B 7/0417; H04B 7/043
USPC ............ 455/446, 561, 63.1, 553.1, 101–103; 370/334, 335, 203, 342, 260; 375/260, 375/267
See application file for complete search history.

(56) References Cited

U.S. PATENT DOCUMENTS

| | | | |
|---|---|---|---|
| 7,676,007 B1 * | 3/2010 | Choi et al. .................... 375/347 |
| 2005/0101259 A1 * | 5/2005 | Tong et al. ..................... 455/69 |
| 2006/0238268 A1 * | 10/2006 | Kwun et al. ..................... 333/20 |
| 2006/0279460 A1 * | 12/2006 | Yun et al. ...................... 342/377 |
| 2007/0092019 A1 * | 4/2007 | Kotecha ............... H04B 7/0452 375/267 |
| 2007/0099571 A1 * | 5/2007 | Withers et al. ............. 455/67.11 |

* cited by examiner

*Primary Examiner* — Wayne Cai
(74) *Attorney, Agent, or Firm* — Meyertons, Hood, Kivlin, Kowert & Goetzel, P.C.

(57) ABSTRACT

A system and method for collaboratively designing optimized beamforming vectors is disclosed for a wireless multiple input, multiple output (MIMO) space division multiple access (SDMA) communication system to optimize an aggregate SNR performance metric across the different users, thereby permitting the flexibility to trade off computational requirements and size of control information exchanged with performance. Using adaptive vector space search methods, the space of all receive beamformers is searched to find the set which maximizes either the sum or product of SNRs of the users.

13 Claims, 6 Drawing Sheets

METHODS FOR OPTIMAL COLLABORATIVE MIMO-SDMA

PRIORITY

This application is a continuation of and claims priority to co-owned U.S. patent application Ser. No. 11/535,702 filed Sep. 27, 2006 and entitled "METHODS FOR OPTIMAL COLLABORATIVE MIMO-SDMA" (issuing as U.S. Pat. No. 8,374,650), the foregoing being incorporated herein by reference in its entirety.

BACKGROUND OF THE INVENTION

1. Field of the Invention

The present invention is directed in general to field of information processing. In one aspect, the present invention relates to a system and method for beamforming for collaborative, space division multiple access systems with transmitter and receiver antenna arrays.

2. Description of the Related Art

The demand for wireless communication systems continues to expand. Wireless communication systems transmit and receive signals within a designated electromagnetic frequency spectrum. The capacity of the electromagnetic frequency spectrum is limited. Thus, the usage expansion of wireless communication systems continually introduces challenges to improve spectrum usage efficiency. Space division multiple access (SDMA) represents one approach to improving spectrum usage efficiency. SDMA has recently emerged as a popular technique for the next generation communication systems. SDMA based methods have been adopted in several current emerging standards such as IEEE 802.16 and the 3rd Generation Partnership Project (3GPP).

FIG. 1 depicts a wireless communication system 100 that employs SDMA. The communication system 100 is a multiple-input multiple-output (MIMO) system. In MIMO systems, transmitters and receivers are both equipped with multiple antennas. The wireless communication system 100 includes multiple base stations 102.1-102.p and multiple subscriber stations 104.1-104.r, where "p" and "r" are integers representing the number of base stations and subscriber stations, respectively, in a given geographic area. Base stations and subscriber stations can be both transmitters and receivers when both base stations and subscriber stations are equipped with a receiver and a transmitter. Base stations generally communicate with multiple subscriber stations. Subscriber stations communicate directly with a base station and indirectly, via the base station, with other subscriber stations. The number of base stations depends in part on the geographic area to be served by the wireless communication system 100. Subscriber systems can be virtually any type of wireless one-way or two-way communication device such as a cellular telephones, wireless equipped computer systems, and wireless personal digital assistants. The signals communicated between base stations and subscriber stations can include voice, data, electronic mail, video, and other data, voice, and video signals.

In an SDMA-MIMO wireless communication system, each base station 102 and subscriber station 104 includes an array of antennas for transmitting and receiving signals. In SDMA, different subscriber stations share the same time-frequency channel and the separation between them occurs in the spatial dimension. During transmission, the antenna array forms a beam or multiple beams by applying a set of weights to signals applied to each antenna in the antenna array. A different set of beam forming weights is applied to communications between the base station and each subscriber station with a goal of minimizing interference between the radio communication devices signals. In some transmission schemes, such as time division duplex (TDD), beam forming between the base station and subscriber stations allows the allocation of the same frequency channel and different time channel to subscriber stations during downlink and uplink. In other transmission schemes, such as frequency division duplex (FDD), beam forming between the base station and subscriber stations allows the allocation of the same time channel and different frequency channel to subscriber stations during downlink and uplink.

FIG. 2 depicts base station 202 and subscriber stations 204.1 through 204.m in an SDMA-MIMO wireless communication system. Base station 202 represents each of base stations 102.1 through 102.p, and subscriber stations 204.1 through 204.m represent any group of m subscriber stations. MIMO systems use beamforming to transmit a single data stream through multiple antennas, and the receiver combines the received signal from the multiple receive antennas to reconstruct the transmitted data. As described in greater detail below, "beamforming" processes a signal for transmission using weight vector $w_i$ and an array of antennas to direct the signal using interference properties, and at the receiver, the received signals detected by the array of antennas are processed using a combining vector $v_i$.

Base station 202 has an array of N antennas 206, where N is an integer greater than or equal to m. The base station prepares a transmission signal, represented by the vector $x_i$, for each signal $s_i$, where $i \in \{1, 2, \ldots, m\}$. (Note: lower case bold variables indicate vectors and upper case BOLD variables indicate matrices). The transmission signal vector $x_i$ is determined in accordance with Equation [1]:

$$x_i = w_i \cdot s_i \quad [1]$$

where $w_i$, is the $i^{th}$ beamforming, N dimensional transmission weight vector (also referred to as a "transmit beamformer"), and each coefficient $w_j$ of weight vector $w_i$ represents a weight and phase shift on the $j^{th}$ transmit antenna 206, where $j \in \{1, 2, \ldots k_i\}$, and $k_i$ represents the number of receiving antennas of the $i^{th}$ subscriber station 204.i. In addition, the term "$s_i$" is the data to be transmitted to the $i^{th}$ receiver. Each of the coefficients of weight vector $w_i$ may be a complex weight. Unless otherwise indicated, transmission beamforming vectors are referred to as "weight vectors," and reception vectors are referred to as "combining vectors," though in systems having reciprocal channels (such as TDD systems), a combining vector v at a receiver/subscriber station can be used as both a combining vector (when receiving signals from a transmitter/base station) and a weighting vector (when transmitting to a transmitter/base station).

The transmission signal vector $x_i$ is transmitted via a channel represented by a channel matrix $H_i$. The channel matrix $H_i$ represents a channel gain between the transmitter antenna array 206 and the $i^{th}$ subscriber station antenna array 208.i. Thus, the channel matrix $H_i$ can be represented by a $N \times k_i$ matrix of complex coefficients, where N is the number of antennas at the base station antenna array 206 and $k_i$ is the number of antennas in the $i^{th}$ subscriber station antenna array 208i. The value of $k_i$ can be unique for each subscriber station. As will be appreciated, the channel matrix $H_i$ can instead be represented by a $k_i \times N$ matrix of complex coefficients, in which case the matrix manipulation algorithms are adjusted accordingly so that, for example, the right singular vector calculation on a $N \times k_i$ channel matrix becomes a left singular vector calculation on a $k_i \times N$ channel matrix. The coefficients of the channel matrix $H_i$ depend, at least in part, on the transmission characteristics of the medium, such as air, through which a signal is transmitted. A variety of methods may be used to determine the channel matrix $H_i$ coefficients, such as transmitting a known pilot signal to a receiver so that the receiver, knowing the pilot signal, can estimate the coefficients of the channel matrix $H_i$ using well-known pilot estimation techniques. Alternatively, the actual channel matrix $H_i$ is known to the receiver and may also be known to the transmitter.

At the subscriber station 204, the transmitted signals are received on the $k_i$ receive antennas. The received signals for the $i^{th}$ subscriber station 204.$i$ are represented by a $k_i \times 1$ received signal vector $y_i$ in accordance with Equation [2]:

$$y_i = s_i H_i^H w_i + \left( \sum_{n=1}^{m} s_n H_i^H w_n - s_i H_i^H w_i \right) \quad [2]$$

where "$s_i$" is the data to be transmitted to the $i^{th}$ subscriber station 204.$i$, "$s_n$" is the data transmitted to the $n^{th}$ subscriber station 204.$n$, "$H_i^H$" represents the complex conjugate of the channel matrix correlating the base station 202 and $i^{th}$ subscriber station 204.$i$, $w_i$ is the $i^{th}$ base station weight vector, and $w_n$ is the $n^{th}$ base station weight vector. The superscript "H" is used herein as a hermitian operator to represent a complex conjugate operator. The $j^{th}$ element of the received signal vector $y_i$ represents the signal received on the $j^{th}$ antenna of subscriber station 204.$i$, $j \in \{1, 2, \ldots, k_i\}$. The first term on the right hand side of Equation [2] is the desired receive signal while the summation terms less the desired receive signal represent co-channel interference.

To obtain a data signal, $z_i$, which is an estimate of the transmitted data $s_i$, the subscriber station 204.$i$ combines the signals received on the k antennas using a combining vector $v_i$ in accordance with Equation [3]:

$$z_i = \hat{s}_i = v_i^H y_i \quad [3].$$

In the context of the foregoing, MIMO-SDMA communication methods can be classified into two major categories: (1) collaborative and (2) non-collaborative. Collaborative MIMO-SDMA methods entail all schemes where the weighting vectors $w_i$ and combining vectors $v_i$ of base station 202 and subscriber station 204.$i$ are designed together in a collaborative fashion. In collaborative MIMO-SDMA, each subscriber stations feeds back the downlink MIMO channel matrix to the base station, and the base station uses the knowledge of MIMO channels to all the subscriber stations 204.1-$m$ to jointly design the weighting and combining vectors for the base station 202 and each subscriber station 204.1-$m$. The combining vectors are then conveyed to each subscriber station, and the communication proceeds with the base station simultaneously transmitting m data packets to each subscriber using their respective transmit weight vectors while each receiver decodes their respective packet using their respective receive weight vector. In contrast, non-collaborative systems employ a sequential design approach so that, for example, the base station 202 (or the subscriber stations 204) designs its weighting vector (or combining vector) first, and then the knowledge of the designed vectors is used to design the remaining set of vectors.

The signal throughput capacity of collaborative SDMA systems is conventionally greater than the capacity of non-collaborative systems since collaborative systems benefit from the joint knowledge of the channels $H_i$, $i \in \{1, 2, \ldots, m\}$, to all the subscriber stations 204.1-$m$, while a combining vector for one subscriber station 204.$i$ in the non-collaborative systems is determined independently of the other subscriber stations 204. While the joint knowledge of the channel conditions is typically collected at the base station 202 through feedback from each subscriber station 204$i$, collaborative SDMA systems typically use this channel condition information to design the weight and combining vectors with the goal of reducing interference between receiving stations. On the other hand, the performance of collaborative systems can be impaired by the overhead associated with the feedback of channel estimate information and the feed forward of combining vector information, in contrast with non-collaborative system which have lower overhead requirements. Thus, conventional approaches result in the design of weight and combining vectors which do not optimize the average signal-to-noise ratio (SNR) for different receiver stations. In addition, conventional approaches do not provide flexibility in terms of trading off computational requirements or the size of control information exchanged with performance. Moreover, conventional approaches require significant control information to be fed back and fed forward, thereby impairing system performance.

Accordingly, there is a need for an improved methodology for designing optimal beamforming weight vectors and combining vectors in a collaborative system. There is also a need for a collaborative MIMO-SDMA system which jointly designs the weight and combining vectors that improve the SNR performance across different users and that provide flexibility in balancing computational requirements with performance. In addition, there is a need for a family of signal processing algorithms for selecting transmit and receive array vectors for MIMO-SDMA which overcomes the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
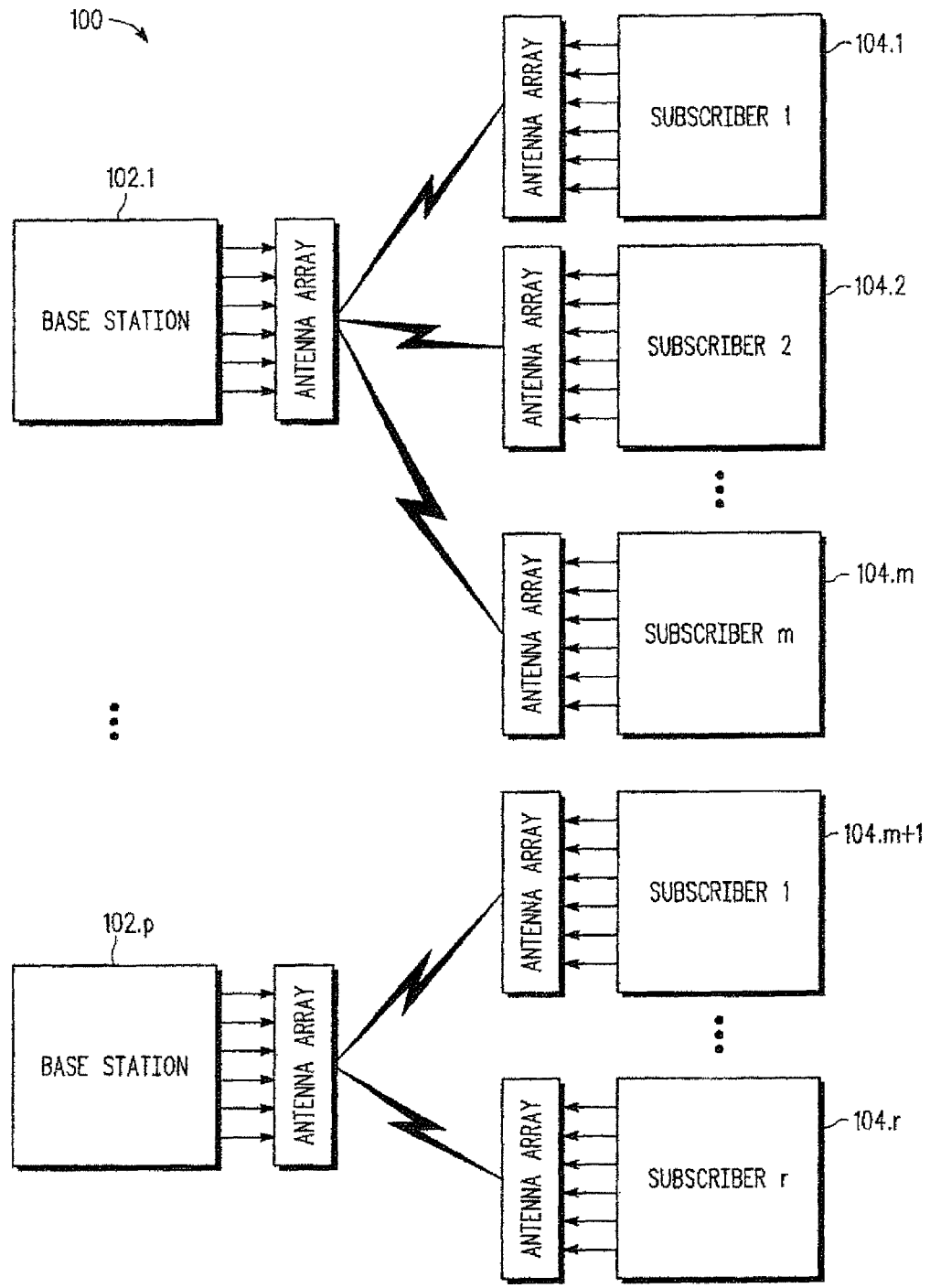
FIG. 1 (labeled prior art) depicts a wireless communication system that employs SDMA.
Figure 2:
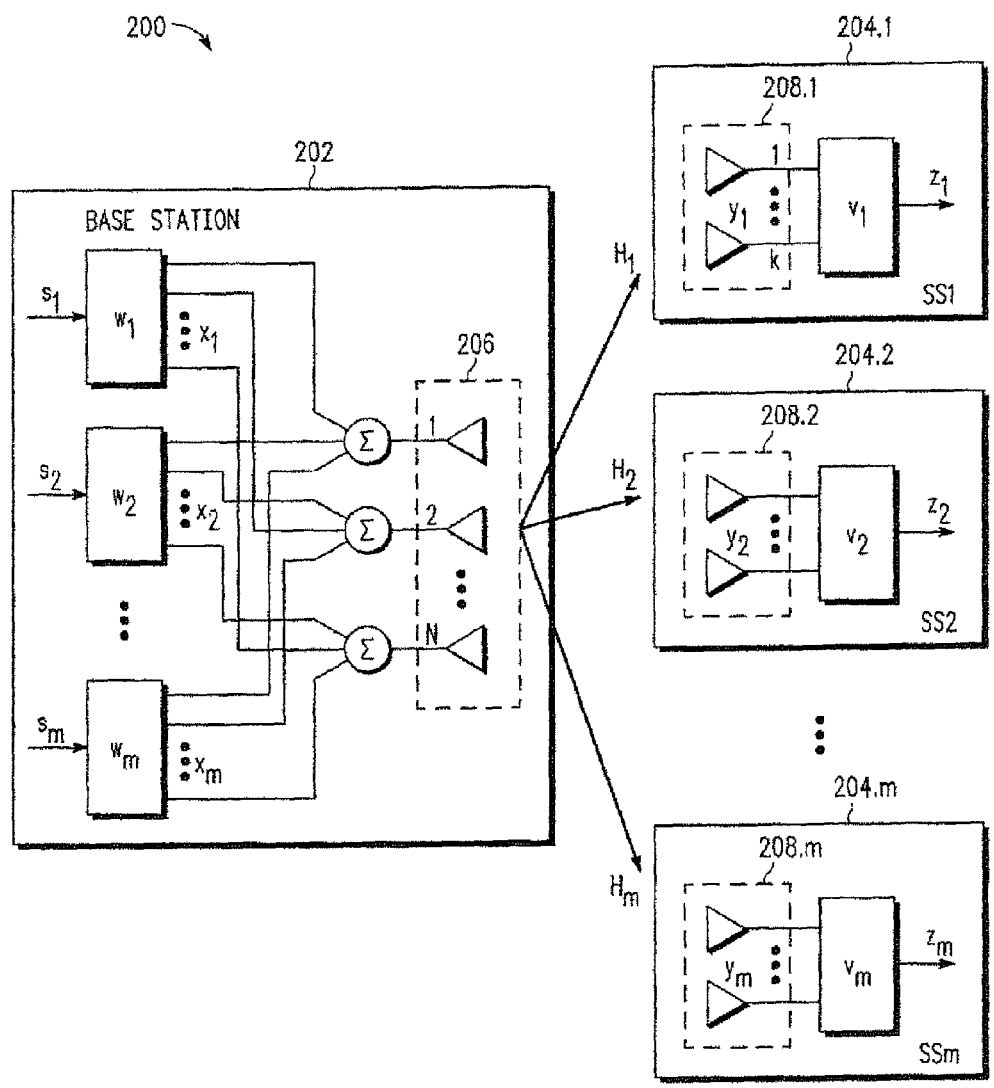
FIG. 2 (labeled prior art) depicts a base station and subscriber stations in an SDMA-MIMO wireless communication system.

It will be appreciated that for simplicity and clarity of illustration, elements illustrated in the drawings have not necessarily been drawn to scale. For example, the dimen-

DETAILED DESCRIPTION

A wireless MIMO-SDMA methodology and system are described for jointly designing beamforming weighting and combining vectors using adaptive vector space search algorithms. Using the assembled MIMO channel information (e.g., channel matrix $H_i$) for all the subscriber stations, the base station collaboratively designs the subscriber station receive combining vector $v_i$ and the base station transmit weighting vector $w_i$ so as to optimize a predetermined performance metric to tradeoff computational complexity and/or the size of control information with performance. In various embodiments, the base station jointly designs the beamforming vectors $(v_1, \ldots v_m; w_1, \ldots, w_m)$ using design algorithms that search through the entire space of the beamformer vectors to maximize a predetermined aggregate performance metric for purposes of choosing a vector pair $w_i$, $v_i$ which maximizes the metric. An example design algorithm searches over the space of all combining beamformers $(v_1, \ldots, v_m)$ to find the set which maximizes either the sum or product of SNRs of the subscriber stations, and then derives, for each set of combining beamformers, the weighting beamformers, such as by using a simple pseudo inverse solution or any equivalent derivation techniques, such as a linearly constrained minimum variance (LCMV) solution. The resulting combining vectors $v_i$ (or their indices) are fed forward to the respective subscriber stations, while the base station retains the weighting vectors $w_i$. With reciprocal channel systems (e.g., TDD), the combining vector $v_i$ at a receiver may be used both for weighting of transmit signals and combining of receive signals, and similarly, the weighting vector $w_i$ at a receiver may be used both for weighting of transmit signals and combining of receive signals. With non-reciprocal systems (e.g., FDD), the base station separately calculates a weighting and combining vector pair $(w_i, v_i)$ for the uplink and downlink channels.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 3:
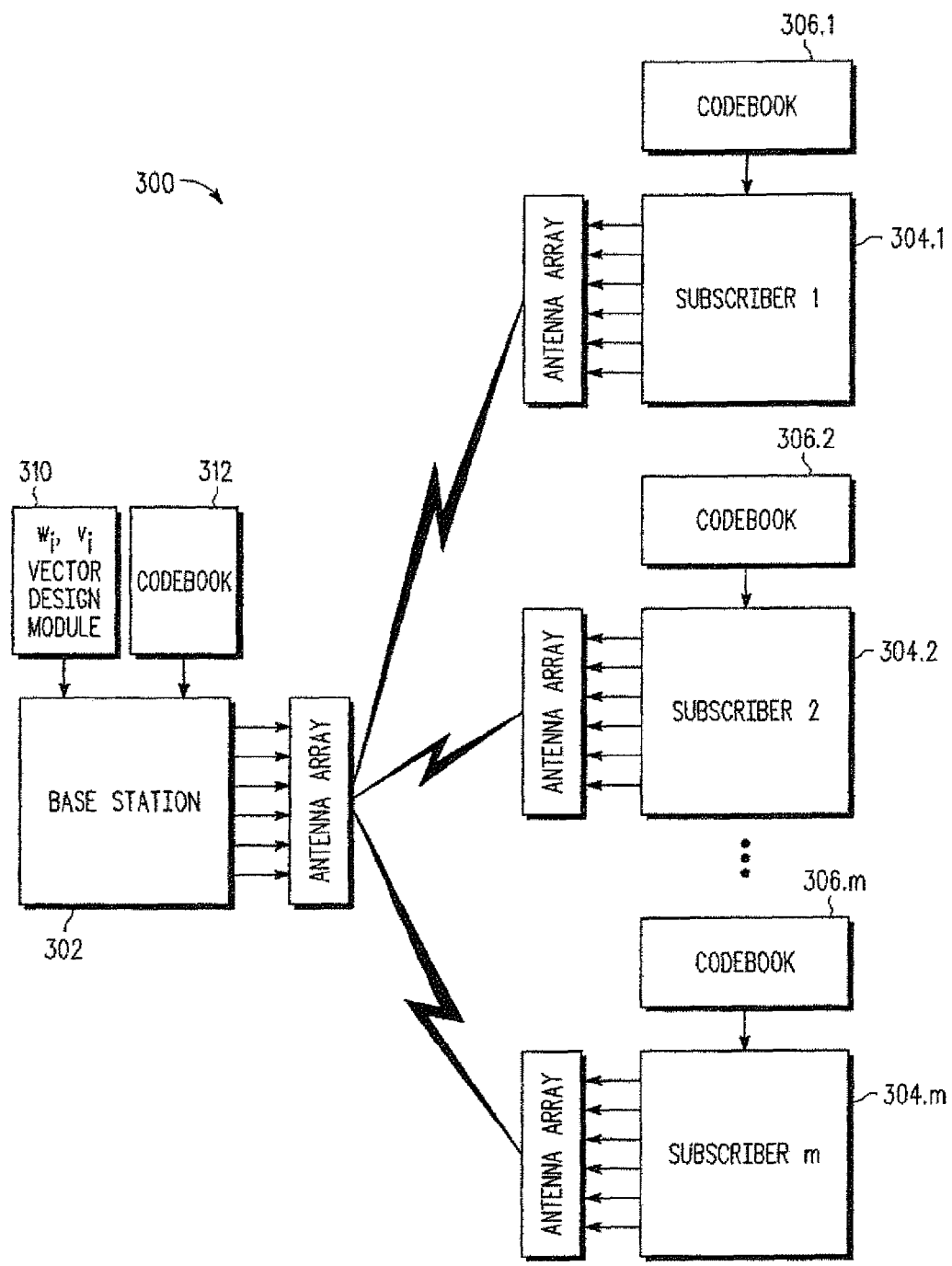
FIG. 3 depicts a wireless communication system with a base station and subscriber stations.

FIG. 3 depicts a wireless communication system 300 with a base station 302 and m subscriber stations 304.1 through 304.m. The wireless communication system 300 is a collaborative MIMO-SDMA system. Thus, each base station 302 includes an array of multiple antennas for communicating with the subscriber stations 304.1 through 304.m, and each subscriber station includes respective antenna arrays for communicating with the base station 302. The number of antennas in the antenna arrays is station dependent. During transmission, the base station 302 may include at least as many antennas as the number of subscriber stations, though there could be more subscribers in the system, such as in situations where the base station only transmits to a number of subscribers that is less than or equal to its antennas at any given time. In accordance with various illustrative embodiments of the collaborative wireless communication system 300, the base station 302 includes a vector design module 310 which is used to jointly design the vectors for each subscriber station $(v_1, \ldots, v_m; w_1, \ldots, w_m)$ to make best use of the existing channel conditions for individual subscriber stations. In addition, each station may include a codebook (such as a base station codebook 312 or subscriber station 306.i) for use in efficiently transferring information in either the feedback and feedforward channel, as described herein below.

In operation, each subscriber station 302.1-m determines its MIMO channel matrix $H_i$—which specifies the transmission channel gain between a transmitter and an $i^{th}$ receiver— and transmits channel-related information to the base station 302. For example, in a MIMO implementation, each subscriber station 304.1-m determines its MIMO channel matrix $H_i$—which specifies the transmission channel gain between a transmitter and an $i^{th}$ receiver—such as by using pilot estimation or sounding techniques to determine or estimate the coefficients of the channel matrix $H_i$. Rather than feeding back the entire vector or matrix representation of the transmission channel (which would require a large number of bits), the channel matrix information may be compressed or quantized by using a codebook (e.g., 306.1) at the subscriber station (e.g., 304.1). The codebook (e.g. 306.1) at the subscriber station (e.g. 304.1) may be used to store an indexed set of possible matrices $H_i$ so that, instead of transmitting the complete matrix information $H_i$, the subscriber station 304.1 retrieves the corresponding index from the codebook 306.1 and feeds back the index to the base station 302 over a low rate feedback channel which uses the index to access the corresponding matrix $H_i$ information from the base station codebook 312. Alternatively, the base station 302 can estimate the channel matrix $H_i$ for each subscriber station 302.1-m, such as by using estimation mechanisms, such as sounding. In other embodiments, the channel matrices used for transmitting and receiving are different (e.g. $H_{iT}$ and $H_{iR}$, from the $i^{th}$ subscriber station's perspective), such as in a frequency division duplex (FDD) system, in which case the subscriber stations 302.1-m transmit a pilot signal to the base station 302 which determines the uplink channel matrix information, while the downlink channel matrix information is detected at each subscriber station and then fed back to the base station, either directly or using codebook feedback techniques.

In any case, with the assembled or estimated MIMO channel matrix information $H_i$ from all subscriber stations, the base station 302 uses the vector design module 310 to jointly design the combining vector $v_i$ and weighting $w_i$ for each subscriber station 302.1-m. In at least one embodiment, the collaborative determination of the weighting vector $w_i$ and combining vector vi for each subscriber station 304i exploits the instantaneous channel conditions by ranking the MIMO channel matrix information $H_1$-$H_m$ to increase the average SNR for each user. Once determined, the vectors $v_i$ are fed forward to the respective subscriber stations. The feed forward channels can also use the codebooks to efficiently convey control information, thereby reducing overhead for the system. For example, the codebook 312 at the transmitter/base station may be used to store an indexed set of possible vectors $v_i$ so that, instead of transmitting the complete vector information $v_i$, the transmitter 302 retrieves the corresponding index from the codebook 312 and feeds forward the index to the receiver (e.g., 304.1) which uses the index to access the corresponding vector $v_i$ information from the receiver codebook (e.g., 306.1). Where both the transmitter and receiver share the estimated channel matrix information $\hat{H}_i$ for the ith receiver (e.g., after $\hat{H}_i$ has been fed back to the transmitter), the set of possible vectors $v_i$ for a given receiver 304.$i$ may be extracted from the corresponding channel matrix $\hat{H}_i$ for that receiver as an ordered set corresponding to the right singular vectors for the corresponding channel matrix $\hat{H}_i$, and an index, which identifies which of the possible vectors corresponds to the designed vector is then fed forward to the receiver 304.$i$. At the receiver, the received index is used to access the set of possible vectors $v_i$ from the right singular vectors for the corresponding channel matrix $\hat{H}_i$ and identify the designed vector $v_i$. For example, in a channel between a transmitter (having four antennas) and a receiver (having two antennas), the designed combining vector $v_i$ will be selected from an ordered set of two possible right singular vectors $\{v_1, v_2\}$. As a result, rather than feeding forward the entire designed combining vector $v_i$ the transmitter can use a one-bit index to identify which of the ordered set is the designed combining vector $v_i$, thus saving feed forward overhead.

Figure 4:
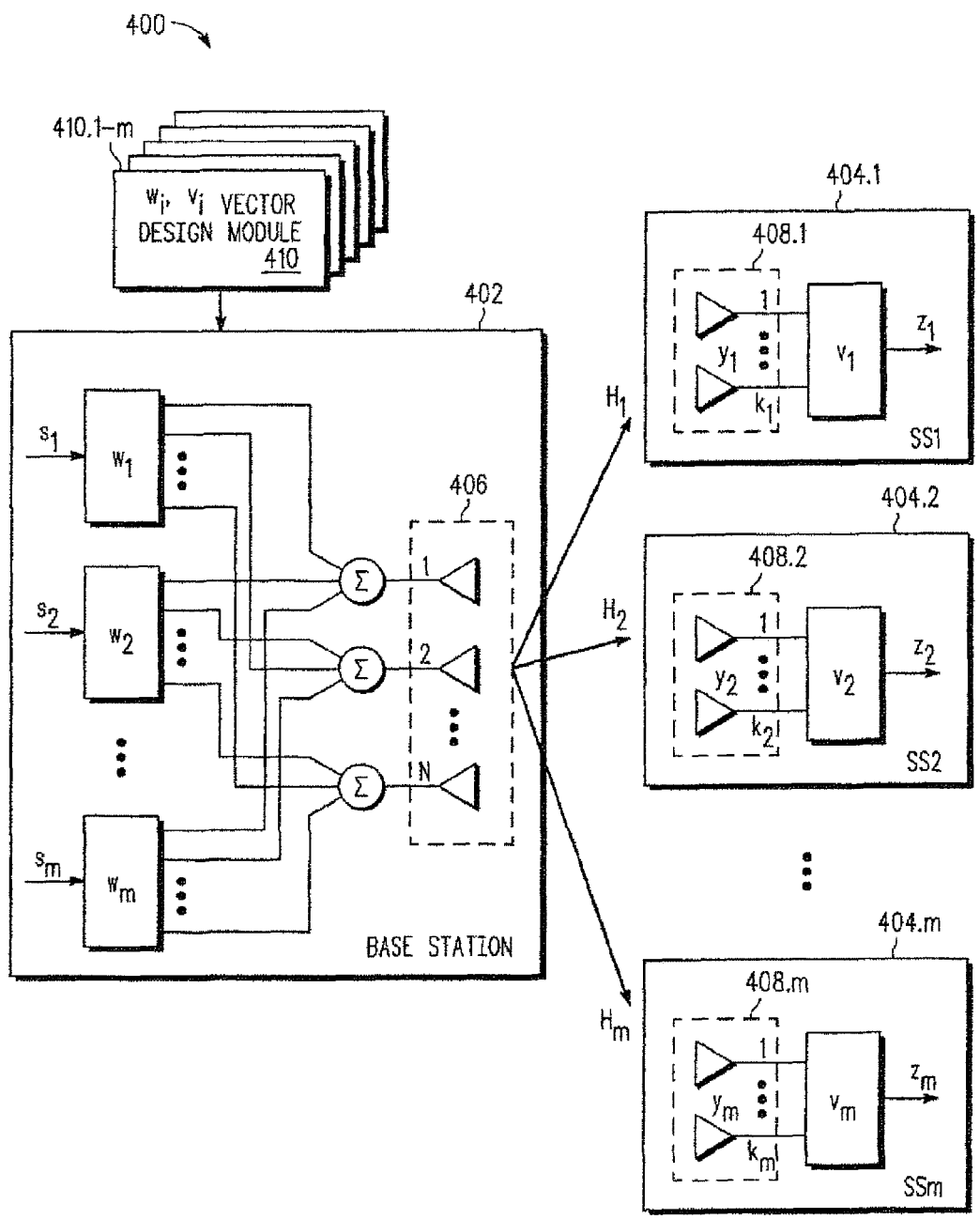
FIG. 4 depicts an embodiment of the wireless communication system in FIG. 3.

FIG. 4 depicts an embodiment of the wireless communication system 300 in more detail. The wireless communication system 400 includes a base station 402 with an antenna array 406 of N antennas. The wireless communication system 400 also includes m different subscriber stations 404.1 through 404.$m$, each with an antenna array 408.1 through 408.$m$. The number of antennas in each subscriber station antenna array can vary between subscriber stations. The MIMO channel from the base station 402 to the $i^{th}$ subscriber station 404.$i$ is denoted by $H_i$, $i \in \{1, 2, \ldots, m\}$. The channel matrix $H_i$ is an $N \times k_i$ matrix of complex entries representing the complex coefficients of the transmission channel between each transmit-receive antenna pair, where N represents the number of base station 402 antennas, and $k_i$ represents the number of antennas of the $i^{th}$ subscriber station. In operation, a data signal $s_i$ presented at the base station 402 for transmission to the subscriber station 404.1 is transformed into a transmission signal, represented by the vector $x_1$ in accordance with equation $x_1 = w_1 \cdot s_1$. At the receiver subscriber station 404.1, the received signal for user 1 is $$1 = \overset{*}{1} \overset{H}{1} \overset{}{1},$$

where $H_1$ is the MIMO channel matrix of dimension $N \times m$, $y_1$ is the $k \times 1$ receive vector at the antenna array 408.1 of the subscriber station 404.1; and k is the number of receive antennas at the subscriber station 404.1. To determine $z_1$ (the estimate for $s_1$), the receiver subscriber station 404.1 computes $z_1 = v_1^H y_1$, where $v_1$ is the combining vector for the subscriber station 404.1.

A collaborative SDMA-MIMO communication process between base station 402 and subscriber stations 404.1 through 404.$m$ can be conceptually separated into an uplink process and a downlink process. In a downlink process, the base station 402 is the transmitter, X equals the number of antennas used for transmitting on the base station 402, and $k_i$ represents the number of antennas of the $i^{th}$ subscriber station 404.$i$ used to receive the transmitted signal. In an uplink process, the subscriber station 404.$i$ is the transmitter, and the base station 402 is the receiver. In an example downlink process, each subscriber station 404$i$ determines its channel matrix information $H_i$ and provides it through feedback to the base station 402. Alternatively, the base station 402 may estimate the channel matrix information for each subscriber station 404.1 to 404.$m$. With the assembled channel matrix information from each subscriber, the vector design module 410 jointly determines, for each subscriber station 404$i$, a beamforming weighting vector $w_i$ (for weighting the signal transmitted by the N antennas of the base station 402) and a combining vector $v_i$ (for combining the signals received by each of the $k_i$ antennas of subscriber station 404.$i$). In at least one embodiment, base station 402 and each of subscriber stations 404.1-404.$m$ include a processor, software executed by the processor, and other hardware that allow the processes used for communication and any other functions performed by base station 402 and each of subscriber stations 404.1-404.$m$. As will be appreciated, the uplink channel and the downlink channel may be the same or different depending upon the choice of communication scheme. For example, the uplink and downlink channels are the same for time division duplex (TDD) communication schemes and different for frequency division duplex (FDD) schemes.

Figure 5:
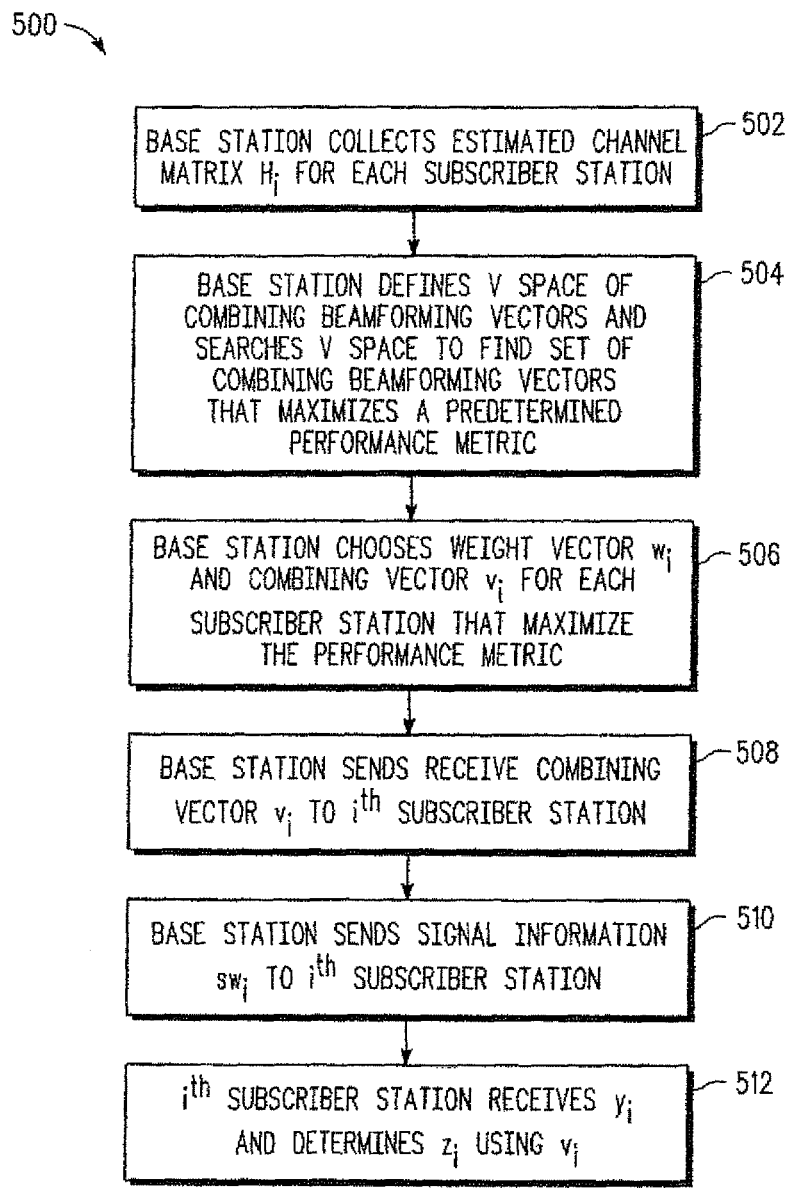
FIG. 5 depicts a collaborative SDMA-MIMO downlink communication process.

FIG. 5 depicts a collaborative SDMA-MIMO downlink communication process 500 that represents one embodiment of a downlink communication process between base station 402 and subscriber stations 404.1 through 404.$m$. Referring to FIGS. 4 and 5, in operation 502, the base station 402 collects estimated channel matrices $\hat{H}_1$ through $\hat{H}_m$ from each subscriber station 404.1-404.$m$. With FDD systems, this may be accomplished by transmitting a pilot signal from the base station 402 to the subscriber stations 404.1-404.$m$, each of which uses a pilot-based channel estimation technique to respectively estimate channel matrices $\hat{H}_1$ through $\hat{H}_m$, where the "^" symbol indicates an estimated value. Pilot-based channel estimation techniques are well-known in the art. The estimated channel matrix information $H_i$ from each subscriber station 404.$i$ is then fed back to the base station 402. As will be appreciated, the base station 402 may instead use other channel estimation techniques (such as sounding mechanisms) to estimate the respective estimated channel matrices $H_i$. For example, with TDD systems where the transmit and receive channels are reciprocal, each of the subscriber stations 404.1-404.$m$ may transmit a pilot signal to the base station 402, which uses a pilot-based channel estimation technique to respectively estimate channel matrices $\hat{H}_i$ through $\hat{H}_m$, where the "^" symbol indicates an estimated value.

In operation 504, the base station 402 defines a space V of combining beamforming vectors ($v_1, \ldots, v_m$) for the subscriber stations 404.1-$m$, and searches the V space to find a set of combining beamforming vectors that maximizes a predetermined performance metric (at step 506), such as maximizing either the sum or product of SNRs of the subscriber station users, though any multidimensional metric may be used that identifies the overall performance of the MIMO channels $H_i$. For each set of combining beamformers, the weighting beamformers are derived using simple pseudo inverse solution or an equivalent thereto, such as an LCMV solution. In accordance with various embodiments, the vector space V may be adaptively searched with a discrete search over different combinations of the singular vectors of the channel matrices of the users (as described, for example, with reference to Algorithm I), or may also be searched with a continuous search over the entire space of the combining beamformer space (as described, for example, with reference to Algorithm II). Regardless of how the search space is defined, a performance metric is established for adaptively searching the space. In an example implementation, a performance metric is established by defining a MIMO channel matrix $X=[H_1v_1\ H_2v_2\ \ldots\ H_mv_m]$, which represents the MIMO channels seen at the base station. In addition, a performance metric value $\gamma(\rho_1, \rho_2, \ldots, \rho_m)$ is defined as a function (e.g., addition or multiplication) of the SNRs of the subscriber stations, which in turn are a function of the weighting beamforming vectors $(w_1, \ldots, w_m)$, which in turn are a function of the chosen combining beamforming vectors $(v_1, \ldots, v_m)$. With the performance metric defined in this way, the goal is to design the $v_i$ such that $\gamma(\cdot)$ is maximized. In an example implementation, for each set of $v_1, v_2, \ldots, v_m$, the weighting beamformers $w_1, w_2, \ldots, w_m$ are designed as $$w_i = X[X^H X]^{-1} e_i$$

where $e_i$ is a vector of all zeros except for 1 in the $i^{th}$ position. The performance metric $\gamma(\cdot)$ may be implemented as a sum of the SNR values for each subscriber station (e.g., $\gamma(\rho_1, \rho_2, \ldots, \rho_m) = \rho_1 + \rho_2 + \ldots + \rho_m$), though other metrics may be defined. For example, the metric $\gamma(\cdot)$ may be implemented as the product of the SNR values for each subscriber station (e.g., $\gamma(\rho_1, \rho_2, \ldots, \rho_m) = \rho_1 * \rho_2 * \ldots * \rho_m$) where the SNR values are given by $\rho_i = 1/|w_i^H w_i|$.

When a discrete search is used to search different possible combinations of the singular vectors of the channel matrices of the users at step 504, a first search algorithm (e.g., Algorithm I) may be used in which the sets of right singular vectors corresponding to the channels of all the subscriber station users (e.g., $v_k = RSV_{max}(H_k)$) are computed, and the best combination of the different user's singular vectors is picked such that the performance metric $\gamma(\cdot)$ is maximized at step 506. For example, if $L_i$ denotes the set of right singular vectors corresponding to $H_i$ (where i=1, 2, ..., m), and the space V is defined to be constrained to the set of right singular vectors $L_i$ (e.g., $V = \{(v_1, v_2, \ldots, v_m): v_i \in L_i\}$), then the combining beamformers may be designed as $$V_{opt} = \underset{V_m \in V}{\operatorname{argmax}} \gamma(V_u)$$

for purposes of choosing beamforming vectors $w_i, v_i$, that maximize the performance metric at step 506. As will be appreciated, the computation of a set of right singular vectors described herein assumes that the channel matrix $H_i$ is organized as an N×k matrix. If the channel matrix $H_i$ is organized as a k×N matrix, then the search algorithm is adjusted to compute the sets of left singular vectors which are used to maximize the performance metric.

Alternatively, when a continuous search is used at step 504, the search is not restricted to singular vectors, but instead searches over the entire space of the combining vectors $v_i$ in order to maximize the performance metric value $\gamma(\rho_1, \rho_2, \ldots, \rho_m)$. In an example implementation, a second search algorithm (e.g., Algorithm II) may be used in which the space V is defined to be constrained to the set of receive beamforming vectors in $C^{k_i}$ (e.g., $V = \{(v_1, v_2, \ldots, v_m): v_i \in C^{k_i}\}$, i=1, 2, ..., m, and $k_i$ is the number of antennas at subscriber station i). With the space V thus defined, the MIMO channel matrix $X=[H_1v_1\ H_2v_2\ \ldots\ H_mv_m]$ is used to search the space V to choose beamforming vectors $w_i, v_i$, that maximize the performance metric $\gamma(\cdot)$ at step 506. Any non-linear optimization routine can be used to implement this algorithm, such as any of the methods proposed in Coleman et al., "An Interior, Trust Region Approach for Nonlinear Minimization Subject to Bounds," SIAM Journal on Optimization, Vol. 6, pp. 418-445 (1996); Coleman et al., "On the Convergence of Reflective Newton Methods for Large-Scale Nonlinear Minimization Subject to Bounds," Mathematical Programming, Vol. 67, Number 2, pp. 189-224 (1994); Gill et al., Practical Optimization, London, Academic Press (1981); Han, "A Globally Convergent Method for Nonlinear Programming," Vol. 22, Journal of Optimization Theory and Applications, p. 297 (1977); Powell, "A Fast Algorithm for Nonlinearly Constrained Optimization Calculations," Numerical Analysis, ed. G. A. Watson, Lecture Notes in Mathematics, Springer Verlag, Vol. 630, (1978); and Powell, "The Convergence of Variable Metric Methods For Nonlinearly Constrained Optimization Calculations," Nonlinear Programming 3 (O. L. Mangasarian, R. R. Meyer, and S. M. Robinson, eds.), Academie Press (1978), each of which is incorporated by reference as if fully set forth herein. The number of iterations for the programming algorithm can be set (e.g., to a maximum or cutoff value) to tradeoff performance with computation time.

In operation 508, once the weight vector $w_i$ and a complementary combining vector $v_i$ are determined, the base station 402 transmits the combining vector $v_i$ information to the subscriber station 404.$i$ that allows the subscriber station 404.$i$ receive and combine signals intended for the subscriber station 404.$i$. In addition or at a later time, the base station 402 transmits up to m different signals to the m subscriber stations 404.1-404.$m$ on the same time-frequency channel at operation 510. The modulated data to be transmitted to subscriber station 404.1 is denoted by $s_i$. Each of the m signals $s_1$ through $s_m$ are transmitted through all the N antennas 406 at base station 402 using unique complex antenna weights $w_1$ through $w_m$, respectively. In at least one embodiment, the actual signal transmitted on each base station 402 antenna is a superposition of vectors $x_1$ through $x_m$, where $x_i = s_i w_i$ and $i \in \{1, 2, \ldots, m\}$.

In operation 512, the subscriber station 404.1 having $k_1$ antennas in antenna array 406.1 receives signal vector $y_1$. In at least one embodiment, for subscribers station 404.1, signal vector $y_1$ is defined by Equation [4]:

$$y_1 = s_1 \hat{H}_1^H w_i + \sum_{i=2}^{m} s_i \hat{H}_1^H w_i + n \quad [4]$$

where "$s_1$" is the data to be transmitted to subscriber station 404.1, "$\hat{H}_1^H$" represents the complex conjugate of the estimated channel matrix $\hat{H}_1$, $w_i$ is the $i^{th}$ beamforming, N dimensional weighting vector, and the vector n represents external noise interference for $i \in \{1, 2, \ldots, m\}$. The superscript "H" is used herein to represent a complex conjugate operator. The $j^{th}$ element of the received signal vector $y_i$ represents the signal received on the $j^{th}$ antenna of subscriber station 404.$i$, $j \in \{1, 2, \ldots, k\}$. Equation [4] can be used for all $y_i$ by letting the first term on the right hand side of Equation [4] be the desired receive signal while the summation terms represent co-channel interference. The subscriber station 404.$i$ then weights and sums the receive signal vector $y_i$ using the combining vector $v_i$ (determined jointly with the weighting vector $w_i$ by base station 402) to determine the desired output data signal $z_i$, which is an estimate of the transmitted data signal $s_i$, in accordance with Equation [5]:

$$z_i = \hat{s}_i = v_i^H y_i \qquad [5]$$

While the description provided herein is with reference to a downlink system, it will be appreciated that the described algorithms can be extended to apply to the uplink communication process too.

Figure 6:
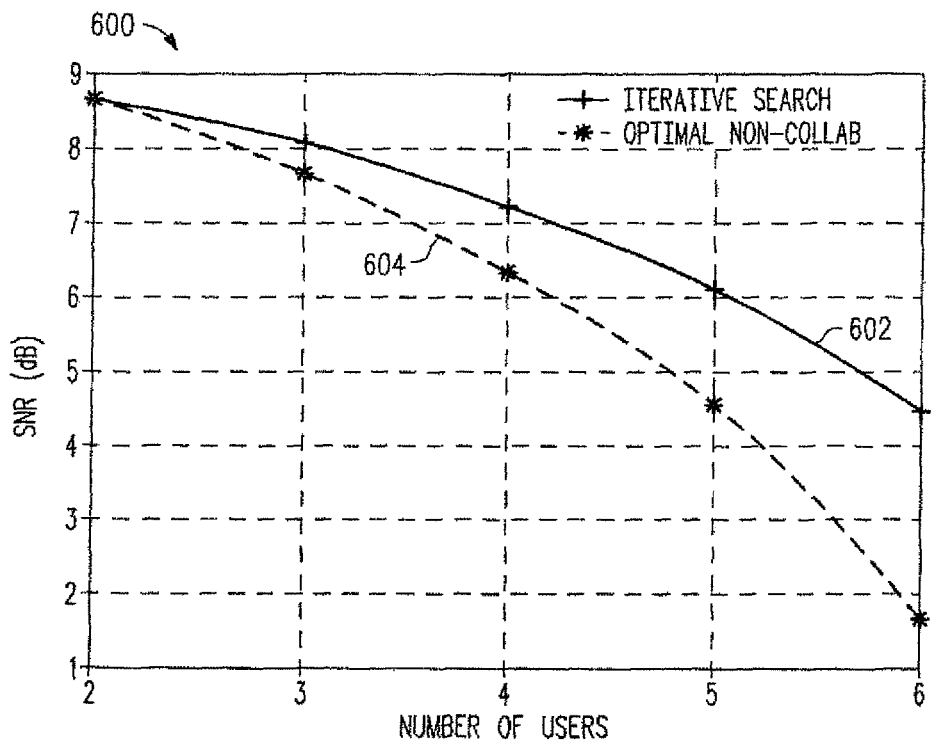
FIG. 6 depicts a simulated comparison of the wireless system in FIG. 4 and non-collaborative systems.

FIG. 6 depicts a simulated comparison 600 between an example non-collaborative process and a wireless communication system 400 using collaborative SDMA-MIMO communication process 500 where the discrete search methodology (e.g., Algorithm I) has been used to design the vector array. For the simulation, the number of base station transmit antennas N=6, and, for each subscriber station, the number of receive antennas k=2. The results are shown for a variable number of subscriber station users "m" on the x-axis. The curve 602 depicts the SNR achieved using a collaborative SDMA-MIMO communication process 500. The curve 604 depicts the SNR achieved using an example non-collaborative scheme. The curve 602 depicts about a 3 dB gain in SNR over the non-collaborative scheme when transmitting to multiple subscriber stations.

Figure 7:
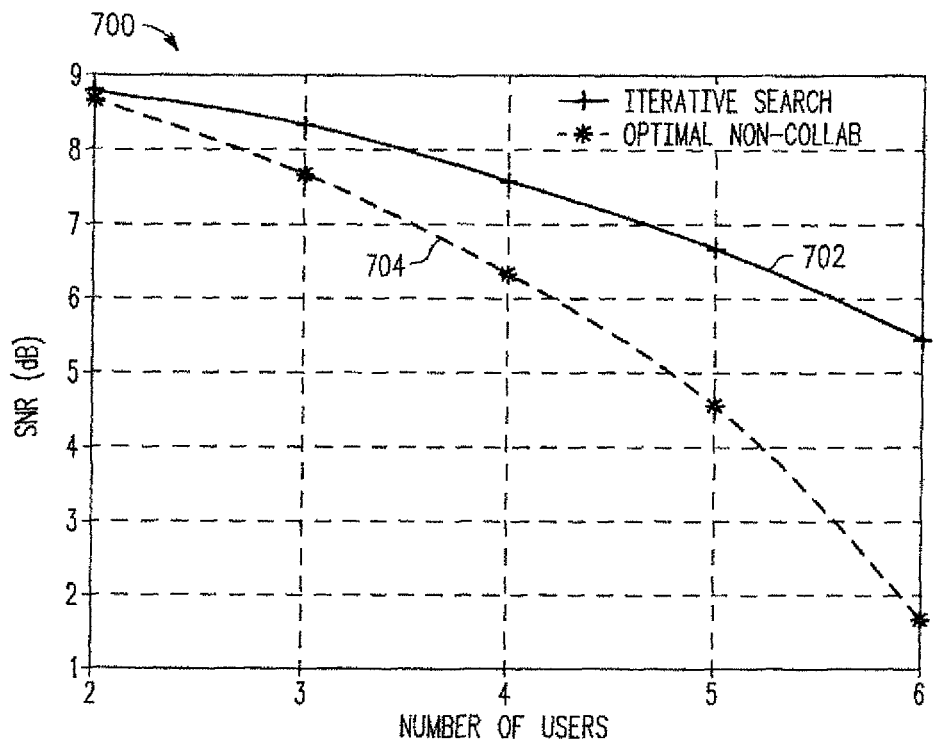
FIG. 7 depicts a simulated comparison of the wireless system in FIG. 4 and conventional systems in the presence of statistical interference.

FIG. 7 depicts a simulated comparison 700 between an example conventional non-collaborative process and a wireless communication system 400 using collaborative SDMA-MIMO communication process 500 where the continuous search methodology (e.g., Algorithm II) has been used to design the vector array. For the simulation, the number of base station transmit antennas N=6, and, for each subscriber station, the number of receive antennas k=2. The results are shown for a variable number of subscriber stations "m" on the x-axis. The curve 702 depicts the SNR achieved using a collaborative SDMA-MIMO communication process 500. The curve 704 depicts the SNR achieved using an example non-collaborative scheme. The curve 702 depicts over a 4 dB gain in SNR over the conventional non-collaborative scheme when transmitting to multiple subscriber stations.

As these simulations show, a discrete search algorithm (e.g, Algorithm I) can be used to achieve good SNR performance with reduced feedback, and does so with only a small difference as compared to the SNR performance of systems using a continuous search algorithm (e.g., Algorithm II). Thus, the search complexity may be reduced using the discrete search algorithm without sacrificing substantial SNR performance. In addition, by using codebook techniques to compress the search results (e.g., the designed combining vectors $v_i$) that are transmitted to the subscriber stations, the overhead associated with transmitting such control information can reduced, thereby improving overall system performance.

By now it should be appreciated that there has been provided a method and system for designing beamforming vectors for a collaborative space division multiple access system. As disclosed, a processor at a base station jointly designs the beamforming vectors w and v by first assembling in channel matrices for m subscriber stations to define a beamformer vector space. This may be implemented at the base station by receiving over a feedback channel the estimated channel matrix H or an index representative of an estimated channel matrix H for a channel between the base station and a first subscriber station, where the index is used at the base station to access the estimated channel matrix H from a codebook for use in jointly designing the beamforming vectors w and v. Subsequently, the base station searches the beamformer vector space to select beamforming vectors w and v for each subscriber station by maximizing a predetermined performance metric. When the vector space is computed to be the entire set of combining vectors $v_i$ corresponding to the subscriber station channels, the entire space is searched using a performance metric that is a function of all combining beamforming vectors $v_1, v_2, \ldots v_m$, for the m subscriber stations, until such time as a predetermined number of iterations have been performed. When the vector space is computed to be the set of right singular vectors corresponding to the subscriber station channels, a discrete search is performed by using a performance metric that is a function of all combining beamforming vectors $v_1, v_2, \ldots v_m$, for the m subscriber stations. A variety of performance metrics may be defined as various functions of selected combining beamforming vectors $v_1, v_2, \ldots v_m$, weighting beamforming vectors $w_1, w_2, \ldots w_m$, and/or channel matrices $H_1, H_2, \ldots H_m$, for the in subscriber stations, including but not limited to using weighted or unweighted sums or products of any selected vector or matrix information. For example, the performance metric may be the sum or product of all SNR values for the in subscriber stations, where an SNR value $\rho_i$ for a subscriber station is defined as $\rho_i = 1/|w_i^H w_i|$, where $w_i = X[X^H X]^{-1} e_i$, where X is a MIMO channel matrix, and where $e_i$ is a vector of all zeros except for a 1 in an $i^{th}$ position. Once the weighting or combining beamforming vectors are designed, they transmitted to the corresponding subscriber stations for use as a weighting or combining vector. This may be done by feeding forward the entire weighting/combining beamforming vector. Codebooks at the subscriber and base stations may also be used to send an index to the subscriber station that identifies a weighting or combining beamforming vector in the codebook, as described herein. Alternatively, the base station can feed forward an index representing the weighting/combining beamforming vector by extracting an ordered set of possible weighting/combining beamforming vectors for a given subscriber station from the channel matrix $\hat{H}_i$ for that subscriber station, and then transmitting an index identifying which of the set of possible weighting/combining beamforming vectors should be extracted from the channel matrix $\hat{H}_i$ at the subscriber station for use as a weighting/combining vector at the corresponding subscriber station.

In another form, a base station is provided which has antennas for transmitting signals to m subscriber stations over in channels represented by a corresponding m channel matrices, respectively. The channel matrix information associated with each channel is collected at the base station, either directly as channel matrices or using codebooks to efficiently feed back channel estimate information by storing an indexed plurality of channel matrices, such that the base station receives over a feedback channel an index representative of an estimated channel matrix $H_i$ for a channel between the base station and subscriber station i, where the index is used at the base station to access the estimated channel matrix $H_i$ from a codebook for use in jointly design the beamformers w and v. At the base station, a module is provided for jointly designing a pair of combining and weighting beamformers for each subscriber station $(v_1, \ldots, v_m; w_1, \ldots, w_m)$ by searching a space of combining beamformers derived from the m channel matrices to find a set of combining beamformers ($v_1, \ldots, v_m$) which maximizes a predetermined performance metric. For example, the performance metric may be the sum or product of all SNR values for the m subscriber stations, where an SNR value $\rho_i$ for a subscriber station is defined as $\rho_i=1/|w_i^H w_i|$, where $w_i=X[X^H X]^{-1} e_i$, where X is a MIMO channel matrix, and where $e_i$ is vector of all zeroes except for a 1 in an $i^{th}$ position. In various embodiments, the space of combining beamformers is searched by assembling channel matrix information for each m subscriber stations, computing a set of right singular vectors from the channel matrix information corresponding to the m channels, and then adaptively searching the set of right singular vectors to choose combining beamformers for each subscriber station ($v_1, \ldots, v_m$) which maximize the predetermined performance metric. In other embodiments, the space of combining beamformers is searched by assembling channel matrix information $H_i$ for each m subscriber stations, deriving combining beamformers $v_i$ from the assembled channel matrix information and then adaptively searching the combining beamformers until a predetermined number of iterations have been performed to choose combining beamformers for each subscriber station ($v_1, \ldots, v_m$) which maximize the predetermined performance metric. Once the set of maximizing combining beamformers ($v_1, \ldots, v_m$) are computed, then each of the combining beamformers is used to derive a corresponding set of weighting beamformers ($w_1, \ldots, w_m$). Once designed, the weighting or combining beamformer that has been designed for a subscriber station is fed forward to that subscriber station so that each of the m subscriber stations receives its corresponding weighting or combining beamformer. This may be done directly by feeding forward the entire weighting or combining beamformer, or may be done indirectly using an index that is representative of the beamformer and that accesses the beamformer from a codebook. Alternatively, the base station can extract an ordered set of possible combining weighting or vectors from the channel matrix $\hat{H}_i$ for a given subscriber station i, generate an index to identify which of the ordered set is the designed weighting/combining beamformer, and then feed forward the index to the subscriber station i, which uses the index to extract the weighting/combining beamformer from the channel matrix $\hat{H}_i$ for use as a weighting/combining beamformer at subscriber station i.

In yet another form, a collaborative MIMO SDMA system is provided which includes a base station and one or more subscriber stations. Each subscriber station feeds back an estimated channel matrix information H (or information representative thereof, such as an index) to the base station. At the base station, channel matrix information H from each subscriber station is assembled and used to jointly design a pair of combining and weighting beamformers for each subscriber station by (1) searching a defined space V of combining beamformers derived from the assembled channel matrix information H to find a set of combining beamformers which maximizes a predetermined performance metric and (2) deriving a weighting beamformer from each combining beamformer. The predetermined performance metric may be a function, such as the sum or product, of all SNR values for the one or more subscriber stations. The base station then feeds forward to each subscriber station a corresponding weighting or combining beamformer (or index thereof) that has been designed for the subscriber station.

In still yet another form, a wireless communication method and system are provided which use beamforming in a collaborative, multiple input, multiple output (MIMO) space division multiple access (SDMA) system. As disclose, a space V of combining beamforming vectors ($v_1, \ldots, v_m$) is defined for a plurality of in subscriber stations based upon channel estimate information obtained from the m subscriber stations. For example, the space V may be defined by deriving a set of right singular vectors from a plurality of estimated channel matrices. The V space is then searched to find a set of combining beamforming vectors that maximizes a predetermined performance metric that is a function of SNRs of the m subscriber stations, and then weighting beamforming vectors are derived for each set of combining beamforming vectors using a pseudo inverse solution.

The methods and systems for providing optimal multi-user beamforming in a collaborative SDMA-MIMO system as shown and described herein may be implemented in hardware or in software stored on a computer-readable medium and executed as a computer program on a general purpose or special purpose computer to perform certain tasks. For a hardware implementation, the elements used to perform various signal processing steps at the base station (e.g., assembling and ranking channel matrix information, computing beamformer pairs, and so on) and/or at the subscriber station(s) (e.g., recovering the transmitted signals, demodulating and decoding the recovered signals, extracting or accessing beamformer information, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the base station and/or subscriber station(s) may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various collaborative MIMO-SDMA communication systems and methods for using same, the present invention is not necessarily limited to the example embodiments illustrate herein. For example, various embodiments of the collaborative MIMO-SDMA system and design methodology disclosed herein may be implemented in connection with various proprietary or wireless communication standards, such as IEEE 802.16e, 3GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wireless communication method using beamforming for a collaborative, multiple input, multiple output (MIMO) space division multiple access (SDMA) system, the method comprising:
   by a mobile device:
      providing estimated channel information; and
      receiving one or more beamforming information, the one or more beamforming information based at least in part on the provided estimated channel information and a plurality of estimated channel information from a respective plurality of mobile devices, wherein the received one or more beamforming information identifies one or more receive combining vectors configured to maximize a predetermined performance metric of the plurality of mobile devices.

2. The method of claim 1, wherein the one or more beamforming information further comprises at least weighting beamforming vectors that are based at least in part on the provided estimated channel information.

3. A mobile device comprising:
   at least one wireless interface, the at least one wireless interface comprising a plurality of antennas;
   a processor in data communication with the at least one wireless interface; and
   computerized logic in data communication with the processor and the at least one wireless interface, the logic configured to:
      determine a channel estimation between the at least one wireless interface and a base station;
      transmit the channel estimation to the base station; and
      receive at least one beamforming parameter from the base station;
   wherein the received at least one beamforming parameter identifies one or more receive combining vectors configured to maximize a performance metric of the mobile device and one or more other mobile devices in communication with the base station based at least in part on the transmitted channel estimation and one or more channel estimations of the one or more other mobile devices.

4. The mobile device of claim 3, wherein the at least one beamforming parameter comprises a codebook index corresponding to a beamforming matrix of a plurality of beamforming matrices.

5. A non-transitory computer-readable medium having a plurality of instructions stored thereon, the plurality of instructions configured to, when executed, cause a subscriber station to:
   provide channel estimation data of the subscriber station to a network entity of a communication system; and
   receive one or more combining beamforming matrices from a set of beaming matrices for the subscriber station, the received one or more combining beamforming matrices configured to improve a transmission performance metric of the communication system based at least in part on the provided channel estimation of the subscriber station and channel estimation of a plurality of subscriber stations in signal communication with the network entity.

6. A method for designing beamforming vectors for a collaborative space division multiple access system, comprising:
   collecting a plurality of channel estimates from a plurality of mobile devices; and for each mobile device of the plurality of mobile devices:
      selecting one or more beamforming parameters from a set of beamforming parameters, where the selection is based at least in part on a channel estimate of the respective mobile device and the plurality of collected channel estimates, wherein the selection identifies one or more receive combining vectors configured to maximize a predetermined performance metric associated with the plurality of mobile devices; and
      providing the selected one or more beamforming parameters to the respective mobile device;
   wherein the one or more beamforming parameters are configured to modify operation of the respective mobile device.

7. The method of claim 6, wherein the one or more beamforming parameters comprise at least a codebook index value corresponding to at least one beamforming matrix.

8. A base station apparatus comprising:
   a wireless interface comprising a plurality of antennas for transmitting one or more signals to a plurality of subscriber stations; and
   computerized logic in data communication with the wireless interface, the logic configured to:
      assemble channel matrices for each of the plurality of subscriber stations;
      define beamforming vector information corresponding at least in part to the assembled channel matrices;
      searching the beamforming vector information to select one or more beamforming parameters for each subscriber station, the selection configured to maximize a performance metric, wherein the one or more beamforming parameters comprise a combining vector for each subscriber station; and
      for each of the subscriber stations, convey the one or more beamforming parameters to the respective subscriber station.

9. The base station apparatus of claim 8, wherein the conveyed one or more beamforming parameters are configured to adjust one or more parameters for a multiple input multiple output operation (MIMO) antenna array of the subscriber station.

10. The base station apparatus of claim 9, wherein the conveyed one or more beamforming parameters comprises one or more codebook indexes corresponding to one or more beamforming matrices.

11. The base station apparatus of claim 9, wherein the assembled channel matrices are based at least in part on a plurality of channel estimates received from the plurality of subscriber stations.

12. The base station apparatus of claim 8, wherein:
the logic is configured to determine a plurality of channel estimates from the plurality of subscriber stations; and
the assembled channel matrices are based at least in part on the plurality of channel estimates.

13. A non-transitory computer-readable medium having a plurality of instructions stored thereon, the plurality of instructions configured to, when executed, cause a base station to:
determine channel estimation information for a plurality of mobile devices;
select one or more beamforming parameters from a set of beam forming parameters for each mobile device of the plurality of the mobile devices, the selection based at least in part on the determined channel estimation information and a performance metric associated with the plurality of mobile devices, wherein the beamforming parameters identify one or more receive combining vectors configured to maximize a predetermined performance metric associated with the plurality of mobile devices; and
forward the selected one or more beamforming parameters to each respective mobile device.

* * * * *